(12) United States Patent
Li et al.

(10) Patent No.: US 10,986,865 B2
(45) Date of Patent: Apr. 27, 2021

(54) SURFACE ACOUSTIC WAVE ELECTRONIC CIGARETTE SYSTEM

(71) Applicant: CHINA TOBACCO YUNNAN INDUSTRIAL CO., LTD, Kunming (CN)

(72) Inventors: Tinghua Li, Kunming (CN); Yi Han, Kunming (CN); Junlong Han, Kunming (CN); Donglai Zhu, Kunming (CN); Hong Hu, Kunming (CN); Yongkuan Chen, Kunming (CN); Jun Wu, Kunming (CN); Shoubo Li, Kunming (CN)

(73) Assignee: CHINA TOBACCO YUNNAN INDUSTRIAL CO., LTD., Kunming (CN)

( * ) Notice: Subject to any disclaimer, the term of this patent is extended or adjusted under 35 U.S.C. 154(b) by 135 days.

(21) Appl. No.: 16/479,218

(22) PCT Filed: Oct. 25, 2018

(86) PCT No.: PCT/CN2018/111769
§ 371 (c)(1),
(2) Date: Jul. 19, 2019

(87) PCT Pub. No.: WO2019/144659
PCT Pub. Date: Aug. 1, 2019

(65) Prior Publication Data
US 2020/0397034 A1     Dec. 24, 2020

(30) Foreign Application Priority Data
Jan. 26, 2018     (CN) .......................... 201810076941.1

(51) Int. Cl.
*A24F 40/10*     (2020.01)
*A24F 40/05*     (2020.01)
(Continued)

(52) U.S. Cl.
CPC ............ *A24F 40/05* (2020.01); *A24B 15/167* (2016.11); *A24F 40/46* (2020.01); *A24F 40/48* (2020.01);
(Continued)

(58) Field of Classification Search
CPC ............ B05B 17/0607; B05B 17/0615; B05B 17/0684; A24F 40/48; A24F 40/05;
(Continued)

(56) References Cited

U.S. PATENT DOCUMENTS

| 6,196,218 B1* | 3/2001 | Voges ................... A24F 47/002 128/200.14 |
| 2009/0206171 A1* | 8/2009 | Friend ............... B01L 3/502792 239/4 |

(Continued)

FOREIGN PATENT DOCUMENTS

| CN | 206025223 U | 3/2017 |
| CN | 206025224 U | 3/2017 |

(Continued)

OTHER PUBLICATIONS

WO-2012011517-A1 (Machine Translation) [online], [retrieved on Jan. 6, 2020], retrieved from Google Patents (https://patents.google.com/) (Year: 2013).*

*Primary Examiner* — Michael H. Wilson
*Assistant Examiner* — Yana B Krinker
(74) *Attorney, Agent, or Firm* — Bayramoglu Law Offices LLC

(57) ABSTRACT

A surface acoustic wave electronic cigarette system includes a piezoelectric substrate, a liquid guiding cavity, an atomization cavity, and a power feeder port. The liquid guiding cavity and the atomization cavity are provided on an upper surface of the piezoelectric substrate. An isolation board is provided between the liquid guiding cavity and the atomi-
(Continued)

Figure 1:
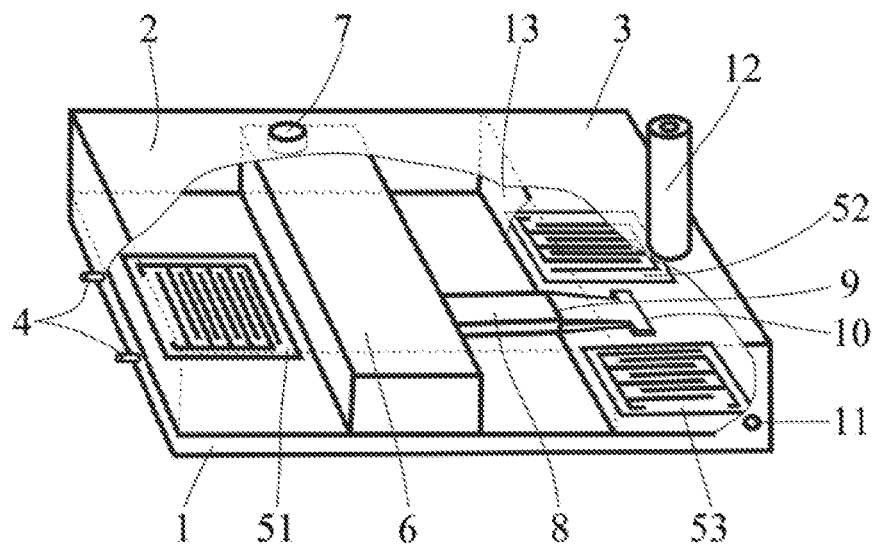

zation cavity. The power feeder port is provided on an outer side surface of the piezoelectric substrate. The surface acoustic wave electronic cigarette of the present disclosure generates an aerosol with a smaller particle diameter by atomization, which has a comfortable smoking experience and a pure and subtle fragrance.

8 Claims, 1 Drawing Sheet

(51) Int. Cl.
*A24B 15/167* (2020.01)
*A24F 40/48* (2020.01)
*A24F 40/46* (2020.01)
*B05B 17/06* (2006.01)
*G01N 29/02* (2006.01)

(52) U.S. Cl.
CPC ....... *B05B 17/0607* (2013.01); *G01N 29/022* (2013.01); *A24F 40/10* (2020.01)

(58) Field of Classification Search
CPC ....... A24F 40/10; A24F 40/46; G01N 20/022; A24B 15/167

USPC .................................................. 239/4, 102.2
See application file for complete search history.

(56) References Cited

U.S. PATENT DOCUMENTS

| | | | |
|---|---|---|---|
| 2011/0192914 A1* | 8/2011 | Ishigami | B05B 17/0607 239/102.2 |
| 2012/0318882 A1* | 12/2012 | Abehasera | A61M 11/041 239/1 |
| 2016/0001316 A1* | 1/2016 | Friend | B05B 17/0676 128/200.16 |
| 2016/0213866 A1* | 7/2016 | Tan | A24F 40/44 |
| 2016/0295913 A1* | 10/2016 | Guo | A24F 40/42 |
| 2017/0119059 A1* | 5/2017 | Zuber | A24F 40/42 |
| 2017/0280771 A1* | 10/2017 | Courbat | B05B 17/0607 |
| 2018/0213866 A1* | 8/2018 | Chien | A41B 15/00 |

FOREIGN PATENT DOCUMENTS

| | | |
|---|---|---|
| CN | 108030153 A | 5/2018 |
| CN | 108095200 A | 6/2018 |
| CN | 108158042 A | 6/2018 |
| WO | WO-2012011517 A1 * | 1/2012 ......... B05B 17/0623 |

* cited by examiner

SURFACE ACOUSTIC WAVE ELECTRONIC CIGARETTE SYSTEM

CROSS REFERENCE TO THE RELATED APPLICATIONS

This application is the national phase entry of International Application No. PCT/CN2018/111769, filed on Oct. 25, 2018, which is based upon and claims priority to Chinese Patent Application No. 201810076941.1, filed on Jan. 26, 2018, the entire contents of which are incorporated herein by reference.

TECHNICAL FIELD

The present disclosure belongs to the technical field of electronic cigarettes, and particularly relates to a surface acoustic wave electronic cigarette system.

BACKGROUND

In recent years, due to the dual pressures of the global tobacco control context and public opinions on public health, the development of traditional cigarettes has been increasingly restrained. As a novel harmless alternative to cigarettes, electronic cigarettes are receiving increasing preferences from enormous consumers. Hence, the global electronic cigarette market has revealed a continually developing momentum.

Most of the existing electronic cigarettes utilize the electrothermal atomization technique, and a small part of the existing electronic cigarettes utilize the ultrasonic atomization technique. The electrothermal atomization is based on the heat conduction principal. The electronic cigarette is started up by an airflow sensor, a mechanical button or a touch-controlled button, and then the circuit is conducted to supply power to a heating wire made by winding nickel-chromium alloy, stainless steel alloy, nickel 200 alloy, or titanium alloy. After that, the e-liquid is heated and atomized to form an aerosol for users to inhale. Although the electrothermal atomization electronic cigarette has a high thermal conductivity and a high atomization efficiency, the heating wire can be continuously heated up to 500-600° C. during the process of constantly smoking the electronic cigarette, which causes a potential safety risk. Meanwhile, the high-temperature pyrolysis of the e-liquid releases harmful ingredients, such as aldehydes, which jeopardize health. The ultrasonic atomization technique produces the high-frequency resonance of a vibrating reed by using the high-frequency oscillation of an ultrasonic transducer, thereby generating an ultrasonic directional pressure to make a surface of the e-liquid protrude. Cavitation occurs around the protruded surface of the e-liquid to atomize the e-liquid, generating an aerosol. Compared with the electrothermal atomization electronic cigarettes, the ultrasonic atomization electronic cigarettes having a low-temperature characteristic improves the safety and releases less harmful ingredients. However, since the ultrasonic wave is a bulk acoustic wave, the energy will uncontrollably diffuse to the surrounding during the propagation process, resulting in a high power consumption, a low velocity and a low efficiency of the atomization of the e-liquid, which is difficult to continuously and stably generate the aerosol with a uniform particle diameter, and has a bad atomization effect of a high-viscosity e-liquid. In addition, it should be noted that, the above two kinds of atomization methods have some common problems as follows: (1) The e-liquid is guided passively through the capillary action of a liquid guiding material, and the liquid guiding rate is uncontrollable and unstable. When the liquid guiding rate is lower than the atomization rate, it is likely to atomize without liquid, thereby producing a bad smell, and seriously affecting the smoking quality and sensory experience. (2) The two kinds of existing electronic cigarette is based on the contact atomization. The e-liquid is in direct contact with the heating wire or the vibrating reed, which is likely to be sintered and adhered. Further, the atomization performance of the heating wire or the vibrating reed is affected, and even their service life is shortened. Therefore, the prior art is imperative to be improved.

SUMMARY

In view of the above-mentioned deficiencies of the prior art, based on an acoustic streaming effect of the surface acoustic wave and an atomization mechanism of a standing surface acoustic wave, the present disclosure organically combines the unique advantages of the surface acoustic wave technique with the functional characteristics and performance requirements of electronic cigarettes and provides a surface acoustic wave electronic cigarette system to realize the active liquid guiding and the surface acoustic wave non-contact atomization by using the surface acoustic wave, which effectively overcomes the deficiencies, such as the potential health risks caused by rapidly heating to a high temperature in the electrothermal atomization, a high power dissipation and low efficiency in the ultrasonic atomization, the uneven particle diameter of the aerosol, and the non-applicability for the high-viscosity e-liquid. Moreover, the present disclosure provides a reasonable solution to address issues of the passive liquid guiding in the prior art, such as the bad smoking experience, and the atomization effect or service life of a heating wire or vibrating reed affected by the contact atomization.

In the present disclosure, a surface acoustic wave electronic cigarette system is provided, including a piezoelectric substrate 1, a liquid guiding cavity 2, an atomization cavity 3, and a power feeder port 4 for loading a high-frequency signal. The liquid guiding cavity 2 and the atomization cavity 3 are provided on an upper surface of the piezoelectric substrate 1. An isolation board 13 is provided between the liquid guiding cavity 2 and the atomization cavity 3. The power feeder port 4 is provided on an outer side of the piezoelectric substrate 1 and connected to an external high-frequency signal source. The liquid guiding cavity 2 includes a first interdigital transducer 51, a liquid storage tank 6, and a micro-flow channel 8. The first interdigital transducer 51 and the micro-flow channel 8 are provided on both sides of the liquid storage tank 6. The liquid storage tank 6 is connected to the micro-flow channel 8. A liquid injection inlet 7 is provided at a top of the liquid storage tank 6. A T-shaped fiber paper inserted into the micro-flow channel 8 through a liquid outlet 9, a second interdigital transducer 52 and a third interdigital transducer 53 are provided at a bottom of the atomization cavity 3. The second interdigital transducer 52 and the third interdigital transducer 53 are provided on both sides of the T-shaped fiber paper 10 and not in contact with the T-shaped fiber paper 10. An air inlet 11 and a drip tip 12 are respectively provided at a side and the top of the atomization cavity 3.

Preferably, the first interdigital transducer 51, the liquid storage tank 6, the micro-flow channel 8, the second interdigital transducer 52, the third interdigital transducer 53, and the T-shaped fiber paper 10 are all closely attached to a surface of the piezoelectric substrate 1.

Preferably, the piezoelectric substrate 1 is made of one of quartz, piezoelectric ceramic, lithium tantalate, or lithium niobate.

Preferably, a material of the piezoelectric substrate 1 is 128.68° YX lithium niobate. A thickness, an electromechanical coupling coefficient, and a temperature coefficient of the piezoelectric substrate and a propagation velocity of the surface acoustic wave of the piezoelectric substrate are 0.5 mm, 5.5%, $-72 \times 10^{-6}/°$ C., and 3992 m/s, respectively.

Preferably, a traveling surface acoustic wave generated by the first interdigital transducer 51 actively pumps an e-liquid stored in the liquid storage tank 6 to the liquid outlet 9 of the micro-flow channel 8. A standing surface acoustic wave cooperatively generated by the second interdigital transducer 52 and the third interdigital transducer 53 atomizes an e-liquid film on the T-shaped fiber paper (10) into an aerosol.

Preferably, the liquid storage tank 6 and the micro-flow channel 8 are made of high borosilicate glass or polydimethylsiloxane. The T-shaped fiber shape 10 is made of an organic porous material.

Preferably, the first interdigital transducer 51, the second interdigital transducer 52, and the third interdigital transducer 53 are all crossed finger-shaped metal films.

Preferably, the metal film is made of aluminum, copper, or gold.

Compared with the prior art, the present disclosure has the following advantages.

Figure 2:
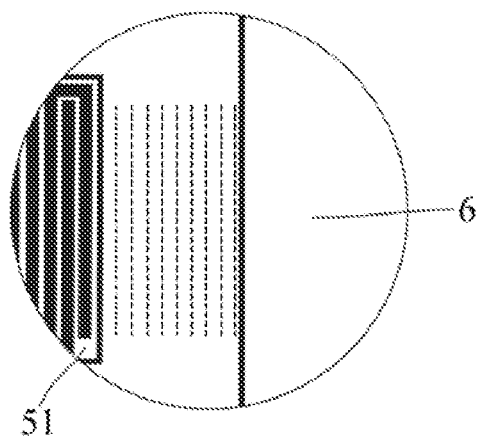
Figure 3:
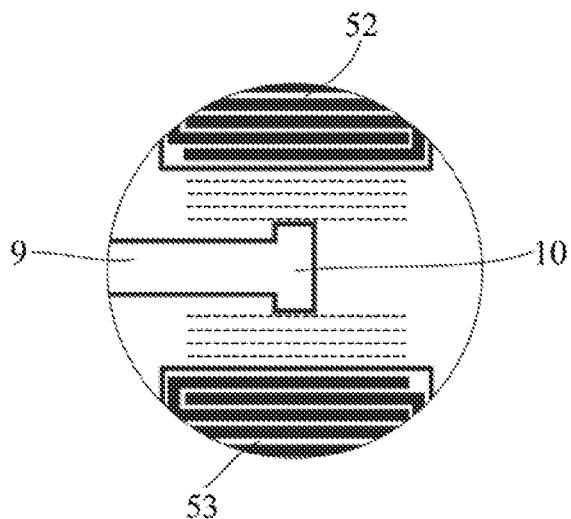

The surface acoustic wave is a mechanical wave propagating along a surface of an elastic medium. The energy is mainly concentrated on the surface of the medium and decays exponentially with depth. The surface acoustic wave has a characteristic of energy directional concentration so that the atomization efficiency is high and the aerosol with good particle diameter uniformity can be continuously and stably produced, which is more suitable for atomizing the high-viscosity e-liquid than ultrasonic waves. In addition, the surface acoustic wave has an excitation frequency usually ranging from 10 MHz-500 MHz, which is an order of magnitude higher than the ultrasonic wave having the excitation frequency ranging from 20 kHz-3 MHz. A relationship equation between the aerosol particle diameter and frequency is $$d = 0.34\sqrt[3]{8\pi\gamma/\rho f^2},$$

where d is a particle diameter of the aerosol, γ is a surface tension of the e-liquid, ρ is a density of the e-liquid, and $f$ is the excitation frequency. The aerosol particle diameter is inversely proportional to $2/3^{th}$ power of the excitation frequency. Therefore, compared with the ultrasonic atomization, the aerosol generated by the surface acoustic wave atomization has a smaller particle diameter which is less likely to remain on an oral mucosa or a tongue surface, has a comfortable smoking experience and a pure and subtle fragrance.

The atomization is realized by diffracting the acoustic energy entering the e-liquid of the surface acoustic wave. The driving power is generally 0.5 W-3 W, thereby generating less heat. Further, the piezoelectric substrate has a certain heat dissipation effect, so even during continuously smoking, the heat is difficult to accumulate, the temperature doesn't rise rapidly, and the possibility of high-temperature pyrolysis is greatly reduced. Therefore, the surface acoustic wave atomization has a good safety performance, and inevitably releases less harmful ingredients than the electrothermal atomization.

The electronic cigarette system of the present disclosure is integrated with the liquid guiding cavity. Based on the acoustic streaming effect of the surface acoustic wave, the traveling surface acoustic wave generated by the first interdigital transducer provides a driving force to actively pump the e-liquid. Further, the e-liquid guiding rate is precisely controlled by adjusting the driving power so as to match with the atomization rate, which ensures the continuous and stable pumping of the e-liquid and the timely and sufficient atomization, overcomes the technical drawbacks of the passive liquid guiding, and avoids atomizing without e-liquid, so as to improve the smoking quality and the user experience.

In the electronic cigarette system of the present disclosure, the second interdigital transducer 52 and the third interdigital transducer 53 do not contact the T-shaped fiber paper 10, and cooperatively excite the standing surface acoustic wave to fulfill the non-contact atomization of the e-liquid film on the T-shaped fiber paper. Since the e-liquid is not in direct contact with the transducers, the e-liquid won't sinter and adhere on the transducer, thereby avoiding the detriment to the working performance or service life of the transducer. Besides, the standing surface acoustic wave has a large energy cardinality and a strong atomization ability to the e-liquid. Thus, the electronic cigarette system of the present disclosure can generate a sufficiently large amount of smoke per unit time, and the user can quickly obtain a smoking satisfaction.

BRIEF DESCRIPTION OF THE DRAWINGS

FIG. 1 is a structural schematic diagram showing an electronic cigarette system for the active liquid guiding and the non-contract atomization through a surface acoustic wave according to the present disclosure;

FIG. 2 is a partially enlarged view showing a liquid guiding cavity of the electronic cigarette system according to the present disclosure;

FIG. 3 is a partially enlarged view showing an atomization cavity of the electronic cigarette system according to the present disclosure.

The reference designators in the figures are described below: 1. piezoelectric substrate, 2. liquid guiding cavity, 3. atomization cavity, 4. power feeder port, 51. first interdigital transducer, 52. second interdigital transducer, 53. third interdigital transducer, 6. liquid storage tank, 7. liquid injection inlet, 8. micro-flow channel, 9. liquid outlet, 10. T-shaped fiber paper, 11. air inlet, 12. drip tip, 13. isolation board.

DETAILED DESCRIPTION OF THE EMBODIMENTS

In order to clearly and definitely illuminate the objective, technical solutions, and advantages of the present disclosure, the present disclosure will be described in detail hereinafter with reference to the drawings and embodiments.

A structural schematic diagram of a surface acoustic wave electronic cigarette system of the embodiment according to the present disclosure is shown in FIG. 1. The system includes the piezoelectric substrate 1, the liquid guiding cavity 2, the atomization cavity 3, and the power feeder port 4. The liquid guiding cavity 2 and the atomization cavity 3 are provided above the piezoelectric substrate 1, and arranged beside one another. The isolation board 13 is provided between the liquid guiding cavity and the atomization cavity. The partially enlarged views of the liquid guiding cavity and atomization cavity are shown in FIG. 2 and FIG. 3, respectively. The power feeder port 4 is provided on an outer side the piezoelectric substrate 1 and connected to an external high-frequency signal source. The liquid guiding cavity 2 includes the first interdigital transducer 51, the liquid storage tank 6, the liquid injection inlet 7 provided on the top of the liquid storage tank 6, and the micro-flow channel 8 connected to the liquid storage tank 6. The T-shaped fiber paper 10, the second interdigital transducer 52, and the third interdigital transducer 53 are provided at a bottom of the atomization cavity 3. The air inlet 11 and the drip tip 12 are respectively provided at a side and a top of the atomization cavity 3.

The first interdigital transducer 51, the liquid storage tank 6, the micro-flow channel 8, the second interdigital transducer 52, the third interdigital transducer 53, and the T-shaped fiber paper 10 all are closely and vertically attached to a surface of the piezoelectric substrate 1. The piezoelectric substrate 1 is made of materials with the piezoelectric property, such as quartz, piezoelectric ceramic, lithium tantalate or lithium niobate. Preferably, the material is 128.68° YX lithium niobate. The thickness, the electro-mechanical coupling coefficient, the temperature coefficient of the piezoelectric substrate and the propagation velocity of the surface acoustic wave of the piezoelectric substrate are respectively 0.5 mm, 5.5%, $-72 \times 10^{-6}/°$ C., and 3992 m/s. The first interdigital transducer 51, the second interdigital transducer 52, and the third interdigital transducer 53 are formed by sputtering and coating a crossed finger-shaped metal film made of aluminum, copper or gold, etc. on the piezoelectric substrate after surface polishing through a micromachining process, and are connected to a high-frequency signal source through the power feeder port 4 which is provided on an outside of the piezoelectric substrate. The first interdigital transducer 51 is provided on one side of the liquid storage tank 6, and an opposite side of the liquid storage tank is connected to the micro-flow channel 8. The material of the liquid storage tank 6 and the micro-flow channel 8 is high borosilicate glass or polydimethylsiloxane. The first interdigital transducer 51 is used to generate the traveling surface acoustic wave to provide a driving force for the e-liquid stored in the liquid storage tank 6, and to actively pump the e-liquid to the micro-flow channel 8. The T-shaped fiber paper 10 is inserted into the micro-flow channel 8 through the liquid outlet 9, for uniformly dispersing the e-liquid and rapidly forming the e-liquid film, and the material of the T-shaped fiber paper is polyester fiber or other organic porous material. The second interdigital transducer 52 and the third interdigital transducer 53 are oppositely provided on both sides of the T-shape fiber paper to form a certain phase difference in the distance, and the standing surface acoustic wave cooperatively generated by the second interdigital transducer and the third interdigital transducer atomizes the e-liquid film on the T-shape fiber paper into an aerosol.

Before using the electronic cigarette system, the e-liquid is injected into the liquid storage tank 6 through the liquid injection port 7 until reaching a certain liquid level of the e-liquid. At the standard atmospheric pressure, since the surface tension of the e-liquid and the viscosity coefficients of an inner wall of the liquid storage tank 6 and an inner wall of the micro-flow channel 8 are constant, the e-liquid does not flow spontaneously. The high-frequency signal source is turned on, and then the first interdigital transducer 51, the second interdigital transducer 52, and the third interdigital transducer 53 are excited by applying an alternating current signal through the power feeder port 4. The transducers convert an electrical signal into an acoustic signal by utilizing an inverse piezoelectric effect of the piezoelectric substrates to form the surface acoustic wave with the same frequency as the applied external signal which is propagated along the surface of the piezoelectric substrate. When the traveling surface acoustic wave generated by the first interdigital transducer 51 is propagated into the liquid storage tank 6, the acoustic energy is diffracted into the e-liquid to generate an acoustic flow coupling effect, so that a pressure difference is formed between the liquid storage tank 6 and the liquid outlet 9, and the pressure field balance of the liquid storage tank 6 is broken. Consequently, the e-liquid is actively pumped to the liquid outlet 9 via the micro-flow channel 8, and is rapidly and uniformly dispersed on the T-shaped fiber paper 10 to form the e-liquid film. By adjusting the driving power, the pressure difference can be altered to realize a quantitative control of the liquid guiding rate, so as to make sure that the e-liquid is continuously and stably pumped, and timely and fully atomized. After oppositely propagating, superimposing and interfering the traveling surface acoustic waves generated by the second interdigital transducer 52 and the third interdigital transducer 53, the standing surface acoustic wave having a large energy cardinality is formed. When the standing surface acoustic wave is in contact with the e-liquid film on the T-shaped fiber paper 10, the energy carried by standing surface acoustic wave will intensively disturb the free surface of the e-liquid film, so that the surface tension of the e-liquid film itself is insufficient to maintain the geometric shape stability, and the e-liquid film ruptures to generate the aerosol.

The above-mentioned descriptions are merely the preferred embodiments of the disclosure, rather than limiting the scope of the present disclosure. Any modifications, equivalent substitutions, or improvements made by a person skilled in the art based on the technical solutions or technical characteristics according to the present disclosure without creative work, should fall within the scope of the present disclosure.

What is claimed is:

1. A surface acoustic wave electronic cigarette system comprising: a piezoelectric substrate, a liquid guiding cavity, an atomization cavity, and a power feeder port, wherein the liquid guiding cavity and the atomization cavity are provided on an upper surface of the piezoelectric substrate; an isolation board is provided between the liquid guiding cavity and the atomization cavity; the power feeder port is provided on an outer side surface of the piezoelectric substrate; the liquid guiding cavity comprises a first interdigital transducer, a liquid storage tank, and a micro-flow channel, wherein the first interdigital transducer is provided on a first side of the liquid storage tank and the micro-flow channel is provided on a second side of the liquid storage tank, the liquid storage tank is connected to the micro-flow channel, and a top of the liquid storage tank is provided with a liquid injection inlet; a T-shaped fiber paper is inserted into the micro-flow channel through a liquid outlet, a second interdigital transducer and a third interdigital transducer are provided at a bottom of the atomization cavity; the second interdigital transducer is provided on a first side of the T-shaped fiber paper and the third interdigital transducer is provided on a second side of the T-shaped fiber paper and are not in contact with the T-shaped fiber paper; an air inlet and a drip tip are respectively provided at a side and the top of the atomization cavity.

2. The surface acoustic wave electronic cigarette system according to claim 1, wherein the first interdigital transducer, the liquid storage tank, the micro-flow channel, the second interdigital transducer, the third interdigital transducer, and the T-shaped fiber paper are closely attached to a surface of the piezoelectric substrate.

3. The surface acoustic wave electronic cigarette system according to claim 1, wherein the piezoelectric substrate is made of a material selected from the group consisting of quartz, piezoelectric ceramic, lithium tantalate, and lithium niobate.

4. The surface acoustic wave electronic cigarette system according to claim 3, wherein the material of the piezoelectric substrate is 128.68° YX lithium niobate; and a thickness of the piezoelectric substrate is 0.5 mm, an electromechanical coupling coefficient of the piezoelectric substrate is 5.5%, a temperature coefficient of the piezoelectric substrate is $-72 \times 10^{-6}$/° C., and a propagation velocity of the surface acoustic wave of the piezoelectric substrate is 3992 m/s.

5. The surface acoustic wave electronic cigarette system according to claim 1, wherein a traveling surface acoustic wave generated by the first interdigital transducer actively pumps an e-liquid stored in the liquid storage tank to the liquid outlet of the micro-flow channel; a standing surface acoustic wave cooperatively generated by the second interdigital transducer and the third interdigital transducer atomizes an e-liquid film on the T-shaped fiber paper into an aerosol.

6. The surface acoustic wave electronic cigarette system according to claim 1, wherein the liquid storage tank and the micro-flow channel are made of a high borosilicate glass or polydimethylsiloxane; the T-shaped fiber paper is made of an organic porous material.

7. The surface acoustic wave electronic cigarette system according to claim 1, wherein the first interdigital transducer, the second interdigital transducer, and the third interdigital transducer are crossed finger-shaped metal films.

8. The surface acoustic wave electronic cigarette system according to claim 7, wherein the metal film is made of aluminum, copper, or gold.

* * * * *